United States Patent [19]

Kato

[11] 4,451,516

[45] May 29, 1984

[54] LOW THERMAL EXPANSION CERAMIC ARTICLE

[75] Inventor: Kiminari Kato, Nagoya, Japan

[73] Assignee: NGK Insulators, Ltd., Nagoya, Japan

[21] Appl. No.: 298,110

[22] Filed: Aug. 31, 1981

[30] Foreign Application Priority Data

Sep. 3, 1980 [JP] Japan ................................ 55-121202

[51] Int. Cl.³ ............................................... B32B 3/12
[52] U.S. Cl. .................................... 428/116; 428/213; 428/118; 428/119; 501/9
[58] Field of Search ............. 501/9; 428/213, 116–119

[56] References Cited

U.S. PATENT DOCUMENTS

| | | | |
|---|---|---|---|
| 3,849,097 | 11/1974 | Giffen et al. | 501/9 |
| 4,063,955 | 12/1977 | Fritsch et al. | 501/9 |
| 4,142,879 | 3/1979 | Fritsch et al. | 501/9 |
| 4,225,354 | 9/1980 | Rao | 501/9 |

FOREIGN PATENT DOCUMENTS

| | | | |
|---|---|---|---|
| 4100409 | 8/1979 | Japan | 501/9 |
| 1456456 | 11/1976 | United Kingdom | 501/9 |

Primary Examiner—George F. Lesmes
Assistant Examiner—E. Rollins Buffalow
Attorney, Agent, or Firm—Parkhurst & Oliff

[57] ABSTRACT

A low thermal expansion ceramic article having a thermal expansion coefficient of not higher than $2.5 \times 10^{-6}$/°C. within the temperature range of 40°–800° C., and comprising a plural number of ceramic parts bonded into a monolithic structure through glass-ceramics consisting mainly of 10–20% of MgO, 20–40% of $Al_2O_3$, 40–60% of $SiO_2$, 0.1–3% of BaO and 0.01–1% of $ZrO_2$, is excellent in the heat resistance and in the thermal shock resistance, and can be advantageously used as a rotary regenerator type heat exchanger and a recuperative heat exchanger for gas turbine engine, stirling engine, and industrial apparatuses; and a rotor for turbocharger.

1 Claim, No Drawings

LOW THERMAL EXPANSION CERAMIC ARTICLE

BACKGROUND OF THE INVENTION

(1) Field of the Invention

The present invention relates to a low thermal expansion ceramic article having excellent heat resistance and thermal shock resistance and a method for producing the same, and more particularly relates to a low thermal expansion ceramic article, comprising a plural number of ceramic parts having a high melting point and a low thermal expansion coefficient, said ceramic parts being bonded into a monolithic structure through specifically limited glass-ceramics having a low thermal expansion coefficient; and a method for producing the same.

(2) Description of the Prior Art

There have recently been eagerly demanded industrial materials having excellent heat resistance and thermal shock resistance corresponding to the progress of industrial technic. Particularly, ceramic materials having a high heat resistance and a low thermal expansion coefficient, such as $MgO-Al_2O_3-SiO_2$ series material (cordierite), $MgO-Al_2O_3-TiO_2$ series material and the like, are widely used as a heat exchanger for automobile and for industrial apparatuses; in the engine part, such as rotor for turbocharger; and the like.

For example, when the ceramic material is used in the heat exchanger of gas turbine for automobile, a plural number of cell-structured parts consisting of thin walls formed of cordierite material are produced, and bonded to produce a cell-structured body having a large diameter of larger than 50 cm, through which gas is passed, and the cell-structured body is unitarily bonded to the hub portion or rim portion having a thick bulk structure, whereby a heat exchanger having a monolithic structure is formed.

However, it is very difficult to bond integrally, firmly and gastightly a cell-structured part and a bulk-structured part having different thicknesses with each other. That is, in conventional methods for bonding a cell-structured part consisting of thin walls formed of a low thermal expansion material to a bulk-structured part having a large thickness to form a monolithic structure, a paste made from the same material as that of shaped articles to be bonded is applied to the unfired shaped article at the portion to be bonded, the unfired shaped articles are assembled, and the assembled shaped articles are fired and concurrently bonded into a monolithic structure. Alternatively, each shaped article is previously fired to produce ceramic parts, and a paste formed of the same material as that of the ceramic parts is applied to the ceramic parts at the portion to be bonded, and the ceramic parts are assembled, heated and bonded. However, in the former method, gaps, cracks and voids are apt to be formed at the bonding portion due to the different firing shrinkages between shaped articles having different thicknesses. While, in the latter method, firing shrinkage occurs at the bonding paste portion during the bonding of ceramic parts contrary to substantially no firing shrinkage of the ceramic parts, and hence gaps, cracks and voids are apt to be formed at the bonding portion. Accordingly, it has been eagerly demanded to develop a ceramic article comprising ceramic parts bonded integrally and firmly, said ceramic parts having different thicknesses with each other and consisting of ceramic materials having an excellent heat resistance and a low thermal expansion coefficient; and a method for producing such ceramic article.

SUMMARY OF THE INVENTION

The inventors have made various investigations in order to obviate the above described drawbacks, and provide a low thermal expansion ceramic article comprising ceramic parts having different thicknesses with each other and bond integrally and firmly through glass-ceramics having a specifically limited composition, and a method for producing the same.

That is, one of the features of the present invention is the provision of a low thermal expansion ceramic article having a thermal expansion coefficient of not higher than $2.5 \times 10^{-6}/°C$. within the temperature range of 40°–800° C., comprising a plural number of ceramic parts bonded into a monolithic structure through glass-ceramics consisting mainly of 10–20% (hereinafter, % means % by weight) of MgO, 20–40% of $Al_2O_3$, 40–60% of $SiO_2$, 0.1–3% of BaO and 0.01–1% of $ZrO_2$.

Another feature of the present invention is the provision of a method for producing low thermal expansion ceramic articles, comprising applying glass powder, which consists mainly of 10–20% of MgO, 20–40% of $Al_2O_3$, 40–60% of $SiO_2$, 0.1–3% of BaO and 0.01–1% of $ZrO_2$, and has a thermal expansion coefficient of not higher than $2.5 \times 10^{-6}/°C$. within the temperature range of 40°–800° C. after crystallization treatment, to the surfaces to be bonded of a plural number of ceramic parts having a thermal expansion coefficient of not higher than $2.5 \times 10^{-6}/°C$. within the temperature range of 40°–800° C.; assembling the ceramic parts; heating the resulting assembly at a temperature of not higher than 1,550° C. to effect the firing and the crystallization treatment of the glass powder, whereby the ceramic parts are bonded into a monolithic structure.

DESCRIPTION OF THE PREFERRED EMBODIMENT

The present invention will be explained in more detail hereinafter.

In the present invention, for example, $MgO-Al_2O_3-SiO_2$ series composition (cordierite), $MgO-Al_2O_3-TiO_2$ series composition or the like having a thermal expansion coefficient, after firing, of $2.5 \times 10^{-6}/°C$. within the temperature range of 40°–800° C. is used as a material for ceramic part having excellent heat resistance and low thermal expansion coefficient, and is separately molded, for example, into a honeycomb-shaped cell-structured part consisting preferably of thin walls and into a cylindrical or prism-shaped bulk-structured part having a large thickness by a commonly used molding method for ceramics, such as extrusion molding, press molding or the like; the resulting cell-structured part and bulk-structured part are worked into given shapes, such as shapes for forming heat-exchanger or the like, and then fired; the portion to be bonded of these ceramic parts is applied with glass powder having a composition consisting mainly of 10–20% of MgO, 20–40% of $Al_2O_3$, 40–60% of $SiO_2$, 0.1–3% of BaO and 0.01–1% of $ZrO_2$ and having a thermal expansion coefficient of $2.5 \times 10^{-6}/°C$. within the temperature range of 40°–800° C. after crystallization treatment; the ceramic parts are assembled; and the resulting assembly is heated at a temperature of not higher than 1,550° C. to effect the firing and crystallization treatment of the glass powder, whereby a plural number of the ceramic parts are bonded into a monolithic structure.

It is most important in the present invention to use glass powder, which is formed into glass-ceramics through crystallization treatment and consists mainly of 10-20% of MgO, 20-40% of $Al_2O_3$, 40-60% of $SiO_2$, 0.1-3% of BaO and 0.01-1% of $ZrO_2$, as a bonding agent for bonding mutually a plural number of ceramic parts as described above. The glass powder, after crystallized and formed into glass-ceramics, has a very low thermal expansion coefficient of not higher than $2.5 \times 10^{-6}/°C$. within the temperature range of 40°-800° C., which coefficient is the same as that of the ceramic parts, and hence the fellow ceramic parts are firmly bonded due to the melting of the glass powder. Moreover, the glass powder is substantially free from the firing shrinkage, and therefore gaps and cracks are not formed at all. Furthermore, due to the crystallization treatment of the glass powder after the bonding of ceramic parts, the resulting glass ceramics have substantially the same low thermal expansion coefficient as that of the ceramic parts, and therefore a low thermal expansion ceramic article having a monolithic structure and having excellent heat resistance and thermal shock resistance can be obtained.

In the present invention, it is an essential requirement that the glass powder to be used as a bonding agent has a composition consisting mainly of 10-20% of MgO, 20-40% of $Al_2O_3$, 40-60% of $SiO_2$, 0.1-3% of BaO and 0.01-1% of $ZrO_2$ as described above and that the glass-ceramics formed by crystallization treatment have a thermal expansion coefficient of $2.5 \times 10^{-6}/°C$. within the temperature range of 40°-800° C. When the composition is outside of the above described range, homogeneous vitrification does not occur, or even in the case where the glass powder is vitrified and then crystallized, the crystallized glass-ceramics have a thermal expansion coefficient of higher than $2.5 \times 10^{-6}/°C$. within the temperature range of 40°-800° C. Therefore, cracks and voids are formed at the bonding portion, and a strong bonding cannot be obtained, or the bonding portion is poor in the thermal shock resistance.

However, the bonding agent may contain impurities so far as the thermal expansion coefficient does not exceed the above described value. For example, the bonding agent may contain CaO, $TiO_2$, $Fe_2O_3$, $K_2O$, $Na_2O$, $MoO_3$, $B_2O_3$, CuO and the like in a total amount of not more than 10%. The effect of BaO and $ZrO_2$ used as essential components in the present invention is nucleation for crystallization, and BaO and $ZrO_2$ are necessary for depositing small crystals having a low thermal expansion coefficient.

As the material of ceramic parts having a thermal expansion coefficient of not higher than $2.5 \times 10^{-6}/°C$. within the temperature range of 40°-800° C., use is preferably made of cordierite consisting mainly of $MgO-Al_2O_3-SiO_2$, and compositions consisting mainly of $MgO-Al_2O_3-TiO_2$, consisting mainly of $MgO-Al_2O_3-TiO_2-Fe_2O_3$ or consisting mainly of $MgO-Al_2O_3-TiO_2-SiO_2-Fe_2O_3$. All of these compositions have a high melting point of not lower than 1,400° C. and a very low thermal expansion coefficient, and therefore they are excellent in the heat resistance and thermal shock resistance.

These materials may contain impurities so far as the heat resistance, thermal shock resistance of the resulting ceramic articles are not deteriorated. For example, the $MgO-Al_2O_3-SiO_2$ series composition may contain compounds, such as $ZrO_2$, $B_2O_3$, $P_2O_5$, BaO, CaO, $Fe_2O_3$, $TiO_2$, $MoO_3$, $Na_2O$, $K_2O$ and the like, in a total amount of not more than 10%. The $MgO-Al_2O_3-TiO_2$ series, $MgO-Al_2O_3-TiO_2-Fe_2O_3$ series and $MgO-Al_2O_3-TiO_2-SiO_2-Fe_2O_3$ series compositions may contain not more than 10% of compounds other than the main component as well.

Among the low thermal expansion ceramic parts to be bonded in the present invention, the cell-structured parts consisting of thin walls include, for example, structural parts, which constitute the passage portion for gas in the regenerator type heat exchanger, recuperative heat exchanger or rotor for turbocharger, and consist of thin walls having a thickness of not more than about 2 mm and forming a large number of open holes, which extend from one end to the other end and have an optional cross-sectional shape, for example, triangle, square, hexagon, circle or a combination thereof. The bulk-structured parts having a large thickness include structural parts having a thickness of not less than about 3 times the thickness of the thin walls of the cell-structured parts, for example, the hub portion or rim portion of a regeneration type heat exchanger; the sealing flange portion of a recuperative heat exchanger and the reinforcing layer for thin wall in the outer peripheral portion thereof; the supporting portion arranged at the center of the rotor for a turbocharger; and the like.

The firing condition and the crystallization condition of glass powder for forming glass-ceramics are varied depending upon the composition and particle size of the glass powder. However, the heating at a temperature of higher than 1,550° C. causes excess melting of glass to lower its viscosity, and the glass is flowed out, and a strong bonding cannot be effected. Therefore, the heating for firing and crystallization of glass powder is preferably carried out at a temperature of not higher than 1,550° C. The heat treatment for the firing and crystallization can be effected in two steps, wherein the ceramic parts are bonded by melting glass powder and then crystallization of the glass powder is effected. Alternatively, the melting and crystallization of glass powder can be carried out at the same time in one firing step without carrying out separately a crystallization treatment.

The following examples are given for the purpose of illustration of this invention and are not intended as limitations thereof.

EXAMPLE 1

Cordierite raw material is molded into ceramic segments consisting of triangular cells in a pitch of 1.4 mm and in a wall thickness of 0.12 mm through extrusion molding. The ceramic segments were fired at 1,400° C. for 5 hours to produce 35 pieces of matrix segments of $130 \times 180 \times 70$ mm. The matrix segments were provisionally assembled, and the outer peripheral portion of the matrix segment assembly was partly worked such that the segments would form a rotary regenerator type heat exchanger having a monolithic structure after bonded. Separately, a hub portion consisting of the same cordierite raw material for the matrix segments and having a thickness of about 2 cm in the radial direction so as to be fitted to the center portion of the heat exchanger was produced from the same cordierite raw material as that for the cell-structured matrix segments, and fired at 1,400° C. for 5 hours. The above obtained fellow matrix segments were bonded to each other and further the assembly, which was formed of the matrix segments, and the hub portion arranged in the center portion of the matrix segment assembly were bonded to produce a rotary regenerator type heat exchanger having a monolithic structure in the following manner. That is, glass powder consisting of 14% of MgO, 32% of $Al_2O_3$, 52% of $SiO_2$, 1.5% of BaO, 0.3% of $ZrO_2$ and 0.2% of a total amount of $Fe_2O_3$, $TiO_2$, CaO, $K_2O$, $Na_2O$, $MoO_3$ and $B_2O_3$ and having a thermal expansion coefficient of $1.8 \times 10^{-6}/°C$. within the temperature of 40°–800° C. after crystallization was applied to the bonding portion between the fellow matrix segments and between the matrix segment assembly and the hub portion, and the above described ceramic parts were assembled, the resulting assembly was fired at 1,400° C. for 3 hours to bond mutually the ceramic parts and then kept at 1,150° C. for 1 hour as a crystallization treatment to produce the rotary regenerator type heat exchanger having a monolithic structure. There were not any defects of gaps, cracks, voids and the like in both the bonding portion of the fellow matrix segments and the bonding portion of the matrix segment assembly and the hub portion. Further, in a thermal shock resistance test, wherein the heat exchanger was placed for 30 minutes in an electric furnace maintained at a certain temperature, then taken out from the furnace and cooled in a room, cracks were formed at the matrix segment portion in a temperature difference of 700° C., but were not formed at all at the bonding portions in the temperature difference.

EXAMPLE 2

A batch having a chemical composition consisting of 4.5% of MgO, 37.5% of $Al_2O_3$, 50.5% of $TiO_2$, 2.0% of $SiO_2$ and 5.5% of $Fe_2O_3$ was molded into ceramic segments consisting of square cells in a pitch of 6 mm and in a wall thickness of 1 mm through extrusion molding, and the ceramic segments were fired at 1,500° C. for 3 hours to produce 25 pieces of matrix segments of 200×200×200 mm. The matrix segments were provisionally assembled, and the outer peripheral portion of the matrix segment assembly was subjected to a working of 950 mm$\phi$ such that the segments would form a rotary regenerator type heat exchanger having a monolithic structure after bonded. Separately, a rim portion having a thickness of about 25 mm in the radial direction so as to be fitted to the outer peripheral portion of the above described heat exchanger was produced from the same $MgO$-$Al_2O_3$-$TiO_2$-$SiO_2$-$Fe_2O_3$ series raw material as that for the cell-structured matrix segments such that the rim portion was able to be fitted to the outer peripheral portion of the above obtained heat exchanger, and fired at 1,000° C. for 3 hours. The resulting matrix segments and rim portion had a thermal expansion coefficient of $1.2 \times 10^{-6}/°C$. within the temperature range of 40°14 800° C. The above obtained fellow matrix segments were bonded to each other and further the assembly, which was formed of the matrix segments, and the rim portion arranged in the outer peripheral portion of the matrix segment assembly were bonded to produce a rotary regenerator type heat exchanger having a monolithic structure in the following manner. That is, glass powder consisting of 12% of MgO, 35% of $Al_2O_3$, 49% of $SiO_2$, 2.5% of BaO, 0.5% of $ZrO_2$ and 1.0% of a total amount of $Fe_2O_3$, $TiO_2$, CaO, $K_2O$, $Na_2O$, $B_2O_3$ and the like, and having a thermal expansion coefficient of $1.3 \times 10^{-6}/°C$. within the temperature range of 40°–800° C. after crystallization was applied to the bonding portion between the fellow matrix segments and to the bonding portion between the matrix segment assembly and the rim portion, and the above described ceramic parts were assembled, the resulting assembly was fired at 1,450° C. for 3 hours to bond mutually the ceramic parts, and further subjected to a crystallization treatment of the glass powder under a condition of 300° C. for 0.5 hour, 800° C. for 1 hour and 1,200° C. for 1 hour to obtain a rotary regenerator type heat exchanger for recovering industrial waste heat, which heat exchanger had a monolithic structure consisting of the matrix part and the reinforcing rim part and had a dimension of 1,000 mm$\phi$×200 mmH.

The resulting heat exchanger had not at all drawbacks, such as gaps, voids, cracks and the like, in the bonding portion between the fellow matrix segments in the matrix portion of cell structured part, and in the bonding portion between the matrix portion and the rim portion of bulk structured part, and the matrix portion and the rim portion were firmly bonded into a monolithic structure.

EXAMPLE 3

The oxide composition of glass powder of the present invention, which exhibited good results in the use in the same manner as described in Examples 1 and 2, and that of comparative glass powder, which caused cracks in the bonding portion and exhibited unfavourable results, are shown in the following Table 1.

TABLE 1

| Sample No. | | Glass-ceramics of the present invention | | | | | | | Comparative glass-ceramics | | |
|---|---|---|---|---|---|---|---|---|---|---|---|
| | | 1 | 2 | 3 | 4 | 5 | 6 | 7 | 8 | 9 | 10 | 11 |
| Oxide composition (wt. %) | $SiO_2$ | 39.8 | 44.4 | 47.7 | 48.9 | 56.8 | 56.8 | 47.9 | 57.1 | 55.5 | 34.5 | 36.3 |
| | $Al_2O_3$ | 36.9 | 37.7 | 37.2 | 29.5 | 22.3 | 28.9 | 31.0 | 25.9 | 20.8 | 39.0 | 30.8 |
| | MgO | 18.0 | 14.5 | 10.5 | 18.4 | 18.0 | 10.6 | 9.8 | 14.6 | 13.9 | 17.3 | 11.9 |
| | BaO | 2.8 | 1.0 | 2.0 | 1.0 | 0.2 | 1.5 | 2.5 | 0.4 | 0.5 | 0.2 | 4.0 |
| | $ZrO_2$ | 0.02 | 0.05 | 0.30 | 0.02 | 1.0 | 0.30 | 0.80 | 0.03 | 0.30 | 3.00 | 2.0 |
| | $Fe_2O_3$ | 2.48 | 2.35 | 2.30 | 2.18 | 1.7 | 1.90 | 8.00 | 1.97 | 9.00 | 6.00 | 15.00 |
| | $TiO_2$ | | | | | | | | | | | |
| | CaO | | | | | | | | | | | |
| | $K_2O$ | | | | | | | | | | | |
| | $Na_2O$ | | | | | | | | | | | |
| | $B_2O_3$ | | | | | | | | | | | |
| | $MoO_3$ | | | | | | | | | | | |
| | CuO | | | | | | | | | | | |
| $\alpha^*$ ($\times 10^{-6}/°C$.) | | 2.4 | 2.0 | 1.9 | 2.1 | 2.4 | 2.0 | 2.2 | 2.1 | 5.8 | 6.0 | 4.0 |

*: $\alpha$ represents a thermal expansion coefficient measured within the temperature range of 40-800° C. after crystallization.

As described above, the low thermal expansion ceramic article of the present invention, which is formed of a plural number of ceramic parts bonded into a unitary structure through glass-ceramics having a specifically limited chemical composition, has not drawbacks, such as gaps, cracks, voids and the like, in the bonding portion, and even in the case where the ceramic article is formed of ceramic parts having different thicknesses, the glass-ceramics exhibit remarkably excellent effect. Moreover, the ceramic article has a monolithic structure having low thermal expansion coefficient. Therefore, the ceramic article has excellent heat resistance and thermal shock resistance, and is very useful in industry as a rotary regenerator type heat exchanger and a recuperative exchanger for gas turbine engine, stirring engine, industrial apparatuses and the like; as a rotor for turbocharger; and the like.

What is claimed is:

1. A low thermal expansion ceramic article having a thermal expansion coefficient of not higher than $2.5 \times 10^{-6}/°C$. within the temperature range of 40°–800° C., comprising cell structured ceramic parts consisting of thin walls bonded to bulk-structured parts having a large thickness through glass-ceramics consisting essentially of 10–20% by weight of MgO, 22.3–40% by weight of $A_{12}O_3$, 40–60% by weight of $SiO_2$, 0.1–3% by weight of BaO, 0.01–1% by weight of $ZrO_2$ and not more than 10% by weight of impurities.

* * * * *